Oct. 10, 1944.  R. U. CLARK  2,359,970
POROUS CONDENSER ELECTRODE
Filed Oct. 14, 1937
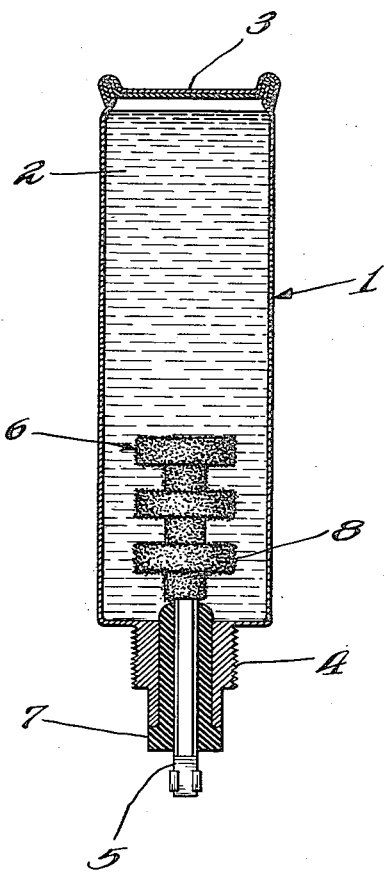
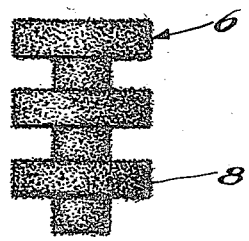
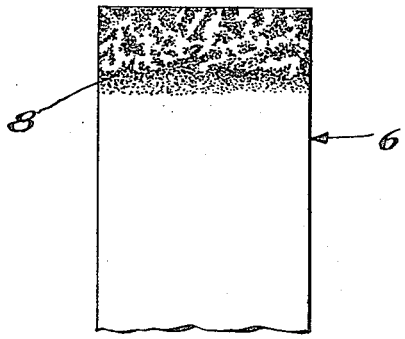
INVENTOR.
Richard U. Clark
BY Clarence J. Loftus
ATTORNEY.

Patented Oct. 10, 1944

2,359,970

UNITED STATES PATENT OFFICE 2,359,970

POROUS CONDENSER ELECTRODE

Richard U. Clark, Fort Wayne, Ind., assignor, by mesne assignments, to The Magnavox Company, Fort Wayne, Ind., a corporation of Delaware Application October 14, 1937, Serial No. 168,899

6 Claims. (Cl. 175—315)

One of the objects of my invention is to provide a condenser electrode suitable for use in electrolytic condensers which provide large capacities in relatively compact form.

A further object is to provide such an electrode of porous metal which may be used for both the anodes and cathodes of electrolytic condensers.

A further object is to provide such an electrode with a non-filming metal rendering it suitable for cathodes if desired.

A further object is to provide for electrolytic condensers a porous electrode embodying tantalum.

The above and other features, advantages and capabilities will become apparent from the following description.

Fig. 1 is a view in vertical cross section of a condenser equipped with my novel electrode.

Fig. 2 is a view in side elevation of one of my novel electrodes.

Fig. 3 is a fragmentary greatly enlarged view of an electrode constructed or formed in accordance with the present invention.

I form my electrode with compressed powders of filming metal which are compressed under sufficient pressure to form a self-supporting structure which may also be sintered to partially join the various powders together, resulting in a porous metal.

This porous metal electrode may be used for both the anodes and cathodes of electrolytic condensers. Where the electrodes are to be used for cathode purposes a non-filming metal may also be added if desired, or non-filming metal powders alone may be used.

One modification of the electrode consists of mixing either filming or non-filming metals, depending on whether it is to be used as an anode or cathode, including a very readily oxidizable metal such as magnesium, compressing and then heating the mixture in an atmosphere such that the magnesium ignites and burns out leaving a very porous metal as a result. Various mixtures of metal may be used. Efficient results may be obtained by the use of tantalum in the mixture. Tantalum is of marked advantage in the mix in obtaining better power factor characteristics in the condenser using such electrodes and also better mechanical strength is achieved.

Fig. 1 shows an electrolytic condenser comprising a sealed container 1 forming the cathode for the condenser as well as an enclosure for the electrolyte 2 which may be any film maintaining type. A cap 3 provides a closure for one end of the container.

At its lower end, the container is provided with a threaded neck portion 4 which serves as a terminal for the cathode and which is hollow for the passage of a terminal 5 for the anode 6. The terminal 5 is suitably insulated from the neck portion 4 as by means of an enclosing rubber or insulating sleeve 7. The electrode or anode 6 comprises a porous filmed slug of suitable porous metal, the film 8 thereon having the necessary dielectric characteristics to provide for storing of electrical energy.

In Fig. 3 there is shown an enlarged or magnified view of the electrode and its porous construction. From this view, it can be seen that the interstices between the powdered particles form continuous paths throughout the slug in various directions. Thus it is always possible with this electrode for any evolved gases or gas bubbles to escape out of the electrode into the solution or electrolyte 2. This is a very desirable feature as occluded gas bubbles within a condenser electrode tend to cause increase in series resistance and loss of capacity. The electrode so formed provides a self-supporting structure which requires no backing of any kind, such as parent metal either in sheet, rod, tube or other possible forms, is composed wholly of compressed powders of filming metals and is porous throughout.

With my electrode made from tantalum powder as above described, it may be used in a condenser in combination with dilute sulphuric acid as an electrolyte. This combination provides a condenser of low series resistance.

A further marked advantage in my process is that the electrode can be initially formed in any desired shape or configuration.

In carrying out my process these electrodes are formed by compressing the powder into the desired shape. Upon the completion of that operation the electrode appears to have an outer glazed surface or relatively smooth shell which may not be sufficiently porous, therefore, in my preferred modification the next step in the method of manufacture is to increase the porosity of its surface by etching, sand blasting, wire brushing or by other suitable means.

My new electrodes may be used in connection with any conventional electrolytic condenser well known and understood in the art and need not here be further described.

Having thus described my invention I claim:

1. A porous electrode for electrolytic condensers, comprising an integral self-supporting structure of a porous mass of finely divided metal particles permanently conductively attached to each other at spaced points on their surface.

2. A porous electrode for electrolytic condensers, comprising a self-supporting porous mass of finely divided particles of tantalum permanently conductively attached to each other at spaced points on their surface.

3. An electrode for electrolytic condensers consisting of an integral self-supporting structure porous throughout and comprising a porous mass of finely divided metal particles permanently conductively attached to each other.

4. An electrode for electrolytic condensers, consisting of an integral self-supporting structure porous throughout and comprising a porous mass of finely divided particles of tantalum permanently conductively attached to each other.

5. A porous electrode for electrolytic condensers, comprising a self-supporting porous mass of finely divided particles of dielectric film forming metals permanently conductively attached to each other.

6. A porous electrolytic condenser element made up of a rigid self-supporting homogeneous sintered body of discrete valve metal particles bonded together.

RICHARD U. CLARK.

Disclaimer 2,359,970.—*Richard U. Clark*, Fort Wayne, Ind. POROUS CONDENSER ELECTRODE. Patent dated Oct. 10, 1944. Disclaimer filed Dec. 2, 1949, by the assignee, *The Magnavox Company*.
Hereby enters this disclaimer to claims 1, 3, and 5 of said patent.
[*Official Gazette January 3, 1950.*]

Disclaimer 2,359,970.—*Richard U. Clark*, Fort Wayne, Ind. POROUS CONDENSER ELECTRODE.
Patent dated Oct. 10, 1944. Disclaimer filed Dec. 2, 1949, by the assignee,
*The Magnavox Company*.
Hereby enters this disclaimer to claims 1, 3, and 5 of said patent.
[*Official Gazette January 3, 1950.*]